US011578381B2

(12) United States Patent
Minami et al.

(10) Patent No.: US 11,578,381 B2
(45) Date of Patent: Feb. 14, 2023

(54) PRODUCTION METHOD FOR HIGH-STRENGTH STEEL SHEET

(71) Applicant: JFE STEEL CORPORATION, Chiyoda-ku Tokyo (JP)

(72) Inventors: Hidekazu Minami, Tokyo (JP); Shinjiro Kaneko, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 34 days.

(21) Appl. No.: 17/447,973

(22) Filed: Sep. 17, 2021

(65) Prior Publication Data

US 2022/0002832 A1 Jan. 6, 2022

Related U.S. Application Data

(62) Division of application No. 16/327,024, filed as application No. PCT/JP2017/030893 on Aug. 29, 2017, now abandoned.

(30) Foreign Application Priority Data

Aug. 31, 2016 (JP) ................................. 2016-169730

(51) Int. Cl.
*C21D 9/46* (2006.01)
*C21D 8/02* (2006.01)
*C22C 38/00* (2006.01)
*C22C 38/02* (2006.01)
*C22C 38/06* (2006.01)
*C22C 38/12* (2006.01)
*C22C 38/14* (2006.01)
*C22C 38/16* (2006.01)
*C22C 38/38* (2006.01)
*C22C 38/60* (2006.01)
*C22C 38/04* (2006.01)
*C21D 1/25* (2006.01)
*C22C 38/34* (2006.01)
*C21D 1/20* (2006.01)
*C21D 1/18* (2006.01)
*C23C 2/06* (2006.01)
*B32B 15/01* (2006.01)
*C21D 6/00* (2006.01)
*C23C 2/00* (2006.01)

(52) U.S. Cl.
CPC .............. *C21D 9/46* (2013.01); *B32B 15/013* (2013.01); *C21D 1/185* (2013.01); *C21D 1/20* (2013.01); *C21D 1/25* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0247* (2013.01); *C21D 8/0273* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *C22C 38/16* (2013.01); *C22C 38/34* (2013.01); *C22C 38/38* (2013.01); *C22C 38/60* (2013.01); *C23C 2/06* (2013.01); *C21D 2211/001* (2013.01); *C21D 2211/002* (2013.01); *C21D 2211/005* (2013.01); *C21D 2211/008* (2013.01); *C23C 2/00* (2013.01)

(58) Field of Classification Search
CPC ....................................................... C21D 9/46
See application file for complete search history.

(56) References Cited

U.S. PATENT DOCUMENTS

| 8,430,975 | B2 | 4/2013 | Nakagaito et al. |
| 8,876,987 | B2 | 11/2014 | Matsuda et al. |
| 8,951,366 | B2 | 2/2015 | Sano et al. |
| 9,162,422 | B2 | 10/2015 | Kawata et al. |
| 9,546,413 | B2 | 1/2017 | Nozaki et al. |
| 10,066,274 | B2 | 9/2018 | Kasuya et al. |

(Continued)

FOREIGN PATENT DOCUMENTS

| CN | 101331019 A | 12/2008 |
| CN | 102308013 A | 1/2012 |

(Continued)

OTHER PUBLICATIONS

Apr. 3, 2020, Office Action issued by the United States Patent and Trademark Office in the U.S. Appl. No. 15/547,876.
Aug. 19, 2020, Office Action issued by the Korean Intellectual Property Office in the corresponding Korean Patent Application No. 10-2019-7009226 with English language concise statement of relevance.

(Continued)

Primary Examiner — Jophy S. Koshy
(74) Attorney, Agent, or Firm — Kenja IP Law PC

(57) ABSTRACT

A production method for a high-strength steel sheet having a tensile strength TS of 780 MPa or more is provided. The production method comprises: heating a steel slab having a predetermined chemical composition; hotrolling the steel slab; coiling the hot-rolled sheet; subjecting the hot-rolled sheet to pickling treatment; holding the hot-rolled sheet in a pre-determined temperature range for predetermined time; cold rolling the hot-rolled sheet to obtain a cold-rolled sheet; subjecting the cold-rolled sheet to first annealing treatment; cooling the cold-rolled sheet at a pre-determined average cooling rate; cooling the cold-rolled sheet to room temperature; reheating the clod-rolled sheet to perform second annealing treatment; cooling the cold-rolled sheet at a first average cooling rate; cooling the cold-rolled sheet at a second average cooling rate; reheating the cold-rolled sheet to a predetermined reheating temperature range; and holding the cold-rolled sheet in the reheating temperature range.

2 Claims, No Drawings

(56) References Cited

U.S. PATENT DOCUMENTS

| | | |
|---|---|---|
| 10,385,431 B2 | 8/2019 | Minami et al. |
| 10,472,697 B2 | 11/2019 | Minami et al. |
| 10,563,279 B2 | 2/2020 | Minami et al. |
| 2007/0190353 A1 | 8/2007 | Taniguchi et al. |
| 2007/0193666 A1 | 8/2007 | Asahi et al. |
| 2012/0018028 A1 | 1/2012 | Shimamura et al. |
| 2014/0242416 A1 | 8/2014 | Matsuda et al. |
| 2016/0083819 A1 | 3/2016 | Kawabe et al. |
| 2016/0177414 A1 | 6/2016 | Takashima et al. |
| 2016/0186283 A1 | 6/2016 | Minami et al. |
| 2017/0175219 A1 | 6/2017 | Kawasaki et al. |
| 2017/0211163 A1 | 7/2017 | Kawasaki et al. |
| 2017/0218472 A1 | 8/2017 | Kawasaki et al. |
| 2018/0016656 A1 | 1/2018 | Minami et al. |
| 2018/0023160 A1 | 1/2018 | Minami et al. |
| 2018/0023161 A1 | 1/2018 | Minami et al. |
| 2018/0179610 A9 | 6/2018 | Minami et al. |
| 2019/0100819 A1 | 4/2019 | Minami et al. |
| 2019/0203316 A1 | 7/2019 | Minami et al. |
| 2019/0226067 A1 | 7/2019 | Minami et al. |
| 2019/0323101 A1 | 10/2019 | Minami et al. |

FOREIGN PATENT DOCUMENTS

| | | |
|---|---|---|
| CN | 103857819 A | 6/2014 |
| EP | 2415891 A1 | 2/2012 |
| EP | 2527483 A1 | 11/2012 |
| JP | 5454745 B2 | 3/2014 |
| JP | 2014043631 A | 3/2014 |
| JP | 2014189868 A | 10/2014 |
| JP | 5728115 B1 | 6/2015 |
| JP | 5943157 B1 | 6/2016 |
| JP | 2016141857 A | 8/2016 |
| WO | 2009096344 A1 | 8/2009 |
| WO | 2011093319 A1 | 8/2011 |
| WO | 2012133540 A1 | 10/2012 |
| WO | 2013047821 A1 | 4/2013 |
| WO | 2013051238 A1 | 4/2013 |
| WO | 2015015739 A1 | 2/2015 |
| WO | 2016021194 A1 | 2/2016 |
| WO | 2016021198 A1 | 2/2016 |

OTHER PUBLICATIONS

Jun. 5, 2020, Office Action issued by the China National Intellectual Property Administration in the corresponding Chinese Patent Application No. 201780052060.X with English language search report.

Mar. 30, 2020, Office Action issued by the United States Patent and Trademark Office in the United States U.S. Appl. No. 15/547,100.

May 13, 2019, the Extended European Search Report issued by the European Patent Office in the corresponding European Patent Application No. 17846478.0.

Nov. 28, 2017, International Search Report issued in the International Patent Application No. PCT/JP2017/030893.

PRODUCTION METHOD FOR HIGH-STRENGTH STEEL SHEET

CROSS-REFERENCE TO RELATED APPLICATIONS

This application is a divisional application of U.S. application Ser. No. 16/327,024 filed Feb. 21, 2019, which is a National Stage Application of PCT/JP2017/030893 filed Aug. 29, 2017, which claims priority to Japanese Patent Application No. 2016-169730 filed on Aug. 31, 2016. The disclosures of the prior applications are hereby incorporated by reference herein in their entirety.

TECHNICAL FIELD

The present disclosure relates to a high-strength steel sheet with excellent formability which is suitable mainly for automobile structural members and a production method therefor, and in particular to provision of a high-strength steel sheet having a tensile strength (TS) of 780 MPa or more, not only excellent ductility but also excellent stretch flangeability, and excellent in-plane anisotropy of TS.

BACKGROUND

To secure passenger safety upon collision and to improve fuel efficiency by reducing the weight of automotive bodies, high-strength steel sheets having a TS of 780 MPa or more and reduced in thickness have been increasingly applied to automobile structural members. Further, in recent years, examination has been made of applications of ultra-high-strength steel sheets with 980 MPa and 1180 MPa grade TS.

In general, however, strengthening of steel sheets leads to a decrease in formability. It is thus difficult to achieve both increased strength and excellent formability. Steel sheets with increased strength and excellent formability have therefore been desired.

Strengthening and thickness reduction of steel sheets significantly decrease shape fixability. To address this problem, a press mold design is widely used that takes into consideration the amount of shape change after release from the press mold as predicted at the time of press forming.

However, while a certain amount of change is predicted for shape change, in the case where steel sheets vary greatly in TS, the amount of shape change deviates markedly from the target, inducing shape defects. Such steel sheets with shape defects require adjustments after subjection to press forming, such as sheet metal working on individual steel sheets, which significantly decreases mass production efficiency. Accordingly, there is demand to minimize variation in the TS of steel sheets.

To meet the demand, for example, JP 2014-189868 A (PTL 1) discloses a high-strength steel sheet that has a chemical composition containing, in mass %, C: 0.15% to 0.40%, Si: 1.0% to 2.0%, Mn: 1.5% to 2.5%, P: 0.020% or less, S: 0.0040% or less, Al: 0.01% to 0.1%, N: 0.01% or less, and Ca: 0.0020% or less, with the balance being Fe and inevitable impurities, and has a microstructure in which, in area fraction to the whole microstructure, ferrite phase and bainite phase in total are 40% to 70%, martensite phase is 20% to 50%, and retained austenite phase is 10% to 30%. Such a high-strength steel sheet has a tensile strength of 900 MPa or more, and excellent elongation, stretch flangeability, and bendability.

JP 5454745 B2 (PTL 2) discloses a high-strength steel sheet that has a steel component composed of a composition containing, in mass %, C: 0.10% or more and 0.59% or less, Si: 3.0% or less, Mn: 0.5% or more and 3.0% or less, P: 0.1% or less, S: 0.07% or less, Al: 3.0% or less, and N: 0.010% or less where [Si %]+[Al %] ([X %] is mass % of element X) satisfies 0.7% or more, with the balance being Fe and inevitable impurities, and has a steel sheet microstructure in which, in area fraction to the whole steel sheet microstructure, the area fraction of martensite is 5% to 70%, the amount of retained austenite is 5% to 40%, the area fraction of bainitic ferrite in upper bainite is 5% or more, the total of the area fraction of martensite, the area fraction of retained austenite, and the area fraction of bainitic ferrite is 40% or more, 25% or more of the martensite is tempered martensite, the area fraction of polygonal ferrite to the whole steel sheet microstructure is more than 10% and less than 50% and the average grain size of polygonal ferrite is 8 µm or less, the average diameter of a polygonal ferrite grain group which is a ferrite grain group made up of adjacent polygonal ferrite grains is 15 µm or less, and the average C content in the retained austenite is 0.70 mass % or more. Such a high-strength steel sheet has excellent ductility and stretch flangeability, and a tensile strength of 780 MPa to 1400 MPa.

JP 5728115 B2 (PTL 3) discloses a high-strength steel sheet that contains, in mass %, C: 0.10% to 0.5%, Si: 1.0% to 3.0%, Mn: 1.5% to 3%, Al: 0.005% to 1.0%, P: more than 0% and 0.1% or less, and S: more than 0% and 0.05% or less with the balance being iron and inevitable impurities, and has a metal microstructure that includes polygonal ferrite, bainite, tempered martensite, and retained austenite and in which the area fraction a of the polygonal ferrite to the whole metal microstructure is 10% to 50%, the bainite has a multi-phase of high-temperature-induced bainite in which the average center position distance between adjacent retained austenite grains, between adjacent carbide particles, and between adjacent retained austenite grains and carbide particles is 1 µm or more and low-temperature-induced bainite in which the average center position distance between adjacent retained austenite grains, between adjacent carbide particles, and between adjacent retained austenite grains and carbide particles is less than 1 µm, the area fraction of the high-temperature-induced bainite to the whole metal microstructure is more than 0% and 80% or less, the total area fraction of the low-temperature-induced bainite and the tempered martensite to the whole metal microstructure is more than 0% and 80% or less, and the volume fraction of retained austenite to the whole metal microstructure measured by saturation magnetization is 5% or more. Such a high-strength steel sheet has a tensile strength of 780 MPa or more, favorable ductility, and excellent low-temperature toughness.

CITATION LIST

Patent Literatures

PTL 1: JP 2014-189868 A
PTL 2: JP 5454745 B2
PTL 3: JP 5728115 B2

SUMMARY

Technical Problem

Although PTL 1 to PTL 3 disclose high-strength steel sheets excellent in elongation, stretch flangeability, and bendability as workability, in-plane anisotropy of TS is not considered in any of PTL 1 to PTL 3.

It could therefore be helpful to provide a high-strength steel sheet having a TS of 780 MPa or more, not only excellent ductility but also excellent stretch flangeability, and excellent in-plane anisotropy of TS by actively using upper bainite microstructure and finely distributing an appropriate amount of retained austenite, together with an advantageous production method therefor.

Herein, "excellent ductility", i.e. "excellent El (total elongation)", denotes that the value of TS×El is 19000 MPa·% or more.

Moreover, "excellent stretch flangeability" denotes that the value of λ, which is an index of stretch flangeability, is 20% or more regardless of the strength of the steel sheet.

Further, "excellent in-plane anisotropy of TS" denotes that the value of |ΔTS|, which is an index of in-plane anisotropy of TS, is 50 MPa or less. |ΔTS| is calculated according to the following equation (1):

$$|\Delta TS| = (TS_L - 2 \times TS_D + TS_C)/2 \quad (1)$$

where $TS_L$, $TS_D$, and $TS_C$ are TS values measured by performing a tensile test at a crosshead speed of 10 mm/min in accordance with JIS Z 2241 (2011) respectively using JIS No. 5 test pieces collected in three directions: the rolling direction (L direction) of the steel sheet, the direction (D direction) of 45° with respect to the rolling direction of the steel sheet, and the direction (C direction) orthogonal to the rolling direction of the steel sheet.

Solution to Problem

Upon careful examination to develop a high-strength steel sheet having a TS of 780 MPa or more, not only excellent ductility but also excellent stretch flangeability, and excellent in-plane anisotropy of TS, we discovered the following:

(1) An appropriate amount of fine retained austenite can be contained in the microstructure after final annealing, by heating a slab having an appropriately adjusted chemical composition, then subjecting the slab to hot rolling and optionally hot band annealing to soften the hot-rolled sheet, thereafter subjecting the hot-rolled sheet to cold rolling, heating the obtained cold-rolled sheet and subjecting the cold-rolled sheet to first annealing in an austenite single phase region and then controlled cooling, to suppress ferrite transformation and pearlite transformation and cause the microstructure before second annealing to be mainly composed of martensite single phase, bainite single phase, or martensite and bainite mixed phase.

(2) By cooling the steel sheet to less than an upper bainite formation temperature in a cooling process after the second annealing in a ferrite-austenite dual phase region and also controlling the cooling rate in the cooling process to be higher in a first stage than in a latter stage, the degree of undercooling of subsequent upper bainite transformation can be controlled appropriately while suppressing ferrite transformation and pearlite transformation during the cooling. Hence, subsequent reheating to an upper bainite formation temperature range increases the driving force for upper bainite transformation and enables effective formation of upper bainite microstructure.

By making the microstructure before the second annealing mainly composed of martensite single phase, bainite single phase, or martensite and bainite mixed phase and appropriately controlling the cooling rate in the cooling process after the subsequent second annealing to appropriately control the degree of undercooling of upper bainite transformation in this way, upper bainite microstructure can be actively used and also retained austenite can be finely distributed.

A high-strength steel sheet having a TS of 780 MPa or more, not only excellent ductility but also excellent stretch flangeability, and excellent in-plane anisotropy of TS can thus be produced.

The present disclosure is based on these discoveries.

We thus provide:

1. A high-strength steel sheet comprising:
   a chemical composition containing (consisting of), in mass %,
   C: 0.08% or more and 0.35% or less,
   Si: 0.50% or more and 2.50% or less,
   Mn: 1.50% or more and 3.00% or less,
   P: 0.001% or more and 0.100% or less,
   S: 0.0001% or more and 0.0200% or less, and
   N: 0.0005% or more and 0.0100% or less, with the balance being Fe and inevitable impurities;
   a steel microstructure including, in area fraction,
   ferrite: 20% or more and 50% or less,
   upper bainite: 5% or more and 45% or less, and
   martensite: 1% or more and 20% or less, and including, in volume fraction,
   retained austenite: 5% or more, the retained austenite having an average grain size of 2 μm or less; and
   a texture having an inverse intensity ratio of γ-fiber to α-fiber of 3.0 or less.

2. The high-strength steel sheet according to 1., wherein the chemical composition further contains, in mass %, at least one element selected from the group consisting of
   Al: 0.01% or more and 1.00% or less,
   Ti: 0.005% or more and 0.100% or less,
   Nb: 0.005% or more and 0.100% or less,
   V: 0.005% or more and 0.100% or less,
   B: 0.0001% or more and 0.0050% or less,
   Cr: 0.05% or more and 1.00% or less,
   Cu: 0.05% or more and 1.00% or less,
   Sb: 0.0020% or more and 0.2000% or less,
   Sn: 0.0020% or more and 0.2000% or less,
   Ta: 0.0010% or more and 0.1000% or less,
   Ca: 0.0003% or more and 0.0050% or less,
   Mg: 0.0003% or more and 0.0050% or less, and
   REM: 0.0003% or more and 0.0050% or less.

3. A production method for the high-strength steel sheet according to 1. or 2., the production method comprising: heating a steel slab having the chemical composition according to 1. or 2. to 1100° C. or more and 1300° C. or less; hot rolling the steel slab at a finisher delivery temperature of 800° C. or more and 1000° C. or less, to obtain a hot-rolled sheet; coiling the hot-rolled sheet at a coiling temperature of 300° C. or more and 700° C. or less; subjecting the hot-rolled sheet to pickling treatment; thereafter optionally holding the hot-rolled sheet in a temperature range of 450° C. or more and 800° C. or less for a time of 900 s or more and 36000 s or less; thereafter cold rolling the hot-rolled sheet with a rolling reduction of 30% or more, to obtain a cold-rolled sheet; thereafter subjecting the obtained cold-rolled sheet to first annealing treatment of $T_1$ temperature or more and 950° C. or less; thereafter cooling the cold-rolled sheet at an average cooling rate of 5° C./s or more at least to ($T_2$ temperature+100° C.) (i.e. 100° C. above $T_2$ temperature); thereafter cooling the cold-rolled sheet to room temperature; thereafter reheating the cold-rolled sheet to a temperature range of 740° C. or more and the $T_1$ temperature or less to perform second annealing treatment; thereafter cooling the cold-rolled sheet to the $T_2$ temperature or more and (the $T_2$ temperature+150° C.) or less (i.e. 150° C. above the $T_2$ temperature or less) at a first average cooling rate of 8° C./s or more as primary cooling; thereafter cooling the cold-rolled sheet to a cooling end temperature at a second average cooling rate of 3° C./s or more as secondary cooling, the cooling end temperature being 150° C. or more and (the $T_2$ temperature−10° C.) or less (i.e. 10° C. below the $T_2$ temperature or less), wherein an average cooling rate after the second annealing treatment is higher in the primary cooling than in the secondary cooling; thereafter reheating the cold-rolled sheet to a reheating temperature range that is (the $T_2$ temperature−50° C.) or more (i.e. 50° C. below the $T_2$ temperature or more) and (the $T_2$ temperature+50° C.) or less (i.e. 50° C. above the $T_2$ temperature or less) and is (the cooling end temperature+5° C.) or more (i.e. 5° C. above the cooling end temperature or more); and holding the cold-rolled sheet in the reheating temperature range for a time of 10 s or more, wherein the $T_1$ temperature in ° C.=946−203×[% C]$^{1/2}$+45×[% Si]− 30×[% Mn]+150×[% Al]− 20×[% Cu]+11×[% Cr]+400×[% Ti], and the $T_2$ temperature in ° C.=740−490×[% C]− 100×[% Mn]− 70×[% Cr], where [% X] denotes a content of an element X in the steel sheet in mass %, and is 0 for any element not contained in the steel sheet.

4. A high-strength galvanized steel sheet comprising: the high-strength steel sheet according to 1. or 2.; and a galvanized layer on a surface of the high-strength steel sheet.

Advantageous Effect

It is possible to effectively obtain a high-strength steel sheet having a TS of 780 MPa or more, not only excellent ductility but also excellent stretch flangeability, and excellent in-plane anisotropy of TS.

A high-strength steel sheet obtainable according to the present disclosure is very useful in industrial terms, because it can improve fuel efficiency when applied to, for example, automobile structural members by a reduction in the weight of automotive bodies.

DETAILED DESCRIPTION

One of the disclosed embodiments is described in detail below.

The reasons for limiting the chemical composition of the presently disclosed high-strength steel sheet to the range described above are given first. In the following description, "%" representing the content of each element of steel denotes "mass %" unless otherwise specified.

[C: 0.08% or More and 0.35% or Less]

C is an element essential in strengthening the steel sheet and ensuring a stable amount of retained austenite, and necessary to secure martensite amount and retain austenite at room temperature.

If the C content is less than 0.08%, it is difficult to ensure the strength and workability of the steel sheet. If the C content is more than 0.35%, the steel sheet becomes brittle or susceptible to delayed fracture. Besides, a weld and a heat-affected zone (HAZ) hardens significantly, and weldability decreases. The C content is therefore 0.08% or more and 0.35% or less. The C content is preferably 0.12% or more and 0.30% or less, and more preferably 0.15% or more and 0.26% or less.

[Si: 0.50% or More and 2.50% or Less]

Si is an element useful for suppressing the formation of carbides and promoting the formation of retained austenite to improve the ductility of the steel sheet. Si is also effective in suppressing the formation of carbides resulting from the decomposition of retained austenite. Si also exhibits a high solid solution strengthening ability in ferrite, and thus contributes to improved strength of the steel. Additionally, Si dissolved in ferrite improves strain hardenability and increases the ductility of ferrite itself.

To achieve these effects, the Si content needs to be 0.50% or more. If the Si content is more than 2.50%, workability and toughness decrease due to an increase in solid solution amount in ferrite, and surface characteristics degrade due to red scale or the like. Besides, in the case of performing hot dip coating, coatability and adhesion degrade. The Si content is therefore 0.50% or more and 2.50% or less. The Si content is preferably 0.80% or more and 2.00% or less, more preferably 1.00% or more and 1.80% or less, and further preferably 1.20% or more and 1.80% or less.

[Mn: 1.50% or More and 3.00% or Less]

Mn is effective in ensuring the strength of the steel sheet. Mn also improves hardenability to facilitate the formation of a multi-phase microstructure. Furthermore, Mn has the effect of suppressing the formation of pearlite and bainite during a cooling process and facilitating transformation from austenite to martensite. To achieve these effects, the Mn content needs to be 1.50% or more. If the Mn content is more than 3.00%, Mn segregation becomes noticeable in the sheet thickness direction, leading to a decrease in the stability of the steel sheet as a material. Moreover, a decrease in castability and the like ensues. The Mn content is therefore 1.50% or more and 3.00% or less. The Mn content is preferably 1.50% or more and 2.70% or less, and more preferably 1.80% or more and 2.40% or less.

[P: 0.001% or More and 0.100% or Less]

P is an element that has a solid solution strengthening effect and can be added depending on desired strength. P also facilitates ferrite transformation, and is thus effective in forming a multi-phase microstructure. To achieve these effects, the P content needs to be 0.001% or more. If the P content is more than 0.100%, weldability decreases. In addition, in the case where a galvanized layer is subjected to alloying treatment, the alloying rate decreases considerably, impairing galvanizing quality. Besides, grain boundary segregation induces embrittlement, and causes a decrease in anti-crash property. The P content is therefore 0.001% or more and 0.100% or less. The P content is preferably 0.005% or more and 0.050% or less.

[S: 0.0001% or More and 0.0200% or Less]

S segregates to grain boundaries, makes the steel brittle during hot working, and forms sulfides to reduce local deformability. Thus, the S content in the steel needs to be 0.0200% or less. Under manufacturing constraints, however, the S content needs to be 0.0001% or more. The S content is therefore 0.0001% or more and 0.0200% or less. The S content is preferably 0.0001% or more and 0.0050% or less.

[N: 0.0005% or More and 0.0100% or Less]

N is an element that degrades most the anti-aging property of the steel. If the N content is more than 0.0100%, the anti-aging property degrades noticeably. Accordingly, the N content is desirably as low as possible. Under manufacturing constraints, however, the N content needs to be 0.0005% or more. The N content is therefore 0.0005% or more and 0.0100% or less. The N content is preferably 0.0005% or more and 0.0070% or less.

In addition to the basic components described above, the presently disclosed high-strength steel sheet may optionally contain at least one element selected from the group consisting of Al, Ti, Nb, V, B, Cr, Cu, Sb, Sn, Ta, Ca, Mg, and REM singly or in combination. The balance of the chemical composition of the steel sheet is Fe and inevitable impurities.

[Al: 0.01% or More and 1.00% or Less]

Al is an element effective in suppressing the formation of carbides and promoting the formation of retained austenite. Al is also an element that is added as a deoxidizer in steelmaking. To achieve these effects, the Al content needs to be 0.01% or more. If the Al content is more than 1.00%, inclusions in the steel sheet increase, which causes a decrease in ductility. The Al content is therefore 0.01% or more and 1.00% or less. The Al content is preferably 0.03% or more and 0.50% or less.

[Ti: 0.005% or More and 0.100% or Less, Nb: 0.005% or More and 0.100% or Less, V: 0.005% or More and 0.100% or Less]

Ti, Nb, and V each form fine precipitates during hot rolling or annealing and increase the strength. To achieve this effect, the contents of Ti, Nb, and V each need to be 0.005% or more. If the contents of Ti, Nb, and V are each more than 0.100%, formability decreases. Therefore, in the case of adding Ti, Nb, and V, their contents are each 0.005% or more and 0.100% or less.

[B: 0.0001% or More and 0.0050% or Less]

B is an element effective in strengthening the steel. This effect is achieved with a B content of 0.0001% or more. If the B content is added excessively beyond 0.0050%, the area fraction of martensite increases excessively, and the strength increases significantly, which may cause a decrease in ductility. The B content is therefore 0.0001% or more and 0.0050% or less. The B content is preferably 0.0005% or more and 0.0030% or less.

[Cr: 0.05% or More and 1.00% or Less, Cu: 0.05% or More and 1.00% or Less]

Cr and Cu not only serve as solid-solution-strengthening elements, but also act to stabilize austenite in a cooling process during annealing, facilitating the formation of a multi-phase microstructure. To achieve these effects, the Cr content and the Cu content each need to be 0.05% or more. If the Cr content and the Cu content are more than 1.00%, the formability of the steel sheet decreases. Accordingly, in the case of adding Cr and Cu, their contents are each 0.05% or more and 1.00% or less.

[Sb: 0.0020% or More and 0.2000% or Less, Sn: 0.0020% or More and 0.2000% or Less]

Sb and Sn may be added as necessary for suppressing decarbonization of a region of about several tens of micrometers in the surface layer of the steel sheet, which is caused by nitriding and/or oxidation of the steel sheet surface. Suppressing such nitriding or oxidation is effective in preventing a decrease in the amount of martensite formed at the steel sheet surface, and ensuring the strength of the steel sheet and the stability as a material. Excessively adding these elements beyond 0.2000% causes a decrease in toughness. Accordingly, in the case of adding Sb and Sn, their contents are each 0.0020% or more and 0.2000% or less.

[Ta: 0.0010% or More and 0.1000% or Less]

Ta forms alloy carbides or alloy carbonitrides and contributes to higher strength, as with Ti and Nb. Ta also has the effect of significantly suppressing coarsening of precipitates by partially dissolving in Nb carbides or Nb carbonitrides and forming complex precipitates such as (Nb, Ta) (C, N), and stabilizing the contribution of strengthening by precipitation to higher strength of the steel sheet. It is therefore preferable to add Ta.

This precipitate stabilizing effect is achieved when the Ta content is 0.0010% or more. Excessively adding Ta, however, saturates the precipitate stabilizing effect, and causes an increase in alloying cost. Accordingly, in the case of adding Ta, the Ta content is 0.0010% or more and 0.1000% or less.

[Ca: 0.0003% or More and 0.0050% or Less, Mg: 0.0003% or More and 0.0050% or Less, and REM: 0.0003% or More and 0.0050% or Less]

Ca, Mg, and REM are elements used for deoxidation. These elements are also effective in causing spheroidization of sulfides and mitigating the adverse effect of sulfides on local ductility and stretch flangeability. To achieve these effects, the contents of Ca, Mg, and REM each need to be 0.0003% or more. Excessively adding Ca, Mg, and REM beyond 0.0050% leads to increased inclusions and the like, and causes defects on the steel sheet surface or inside. Accordingly, in the case of adding Ca, Mg, and REM, their contents are each 0.0003% or more and 0.0050% or less.

The microstructure of the presently disclosed high-strength steel sheet is described below.

[Area Fraction of Ferrite: 20% or More and 50% or Less]

This is a very important requirement in the present disclosure. The presently disclosed high-strength steel sheet comprises a multi-phase microstructure in which retained austenite mainly influencing ductility and upper bainite mainly influencing strength are distributed in soft ferrite with high ductility. Additionally, to ensure sufficient ductility and balance between strength and ductility, the area fraction of ferrite formed in the second annealing and cooling needs to be 20% or more. To ensure strength, the area fraction of ferrite needs to be 50% or less.

The average grain size of ferrite obtained according to the present disclosure is about 5 μm to 8 μm.

[Area Fraction of Upper Bainite: 5% or More and 45% or Less]

This is a very important requirement in the present disclosure.

The formation of bainite is necessary to concentrate C in non-transformed austenite and obtain retained austenite capable of exhibiting a TRIP effect in a high strain region during working. Increasing the amount of retained austenite formed is effective in achieving both high strength and high ductility. Upper bainite is more advantageous for increasing ductility than lower bainite.

Bainite, in particular upper bainite, is described below.

Transformation from austenite to bainite occurs over a wide temperature range of approximately 150° C. to 550° C., and various types of bainite form in this temperature range. Although these various types of bainite are often simply defined as "bainite" with regard to conventional techniques, upper bainite and lower bainite are separately defined herein because of the need to precisely specify bainite microstructure in order to achieve desired workability.

Upper bainite and lower bainite are defined as follows.

Upper bainite is composed of lath bainitic ferrite and retained austenite and/or carbides present between bainitic ferrite, and has a feature that no regularly arranged fine carbide exists in lath bainitic ferrite. Lower bainite is composed of lath bainitic ferrite and retained austenite and/or carbides present between bainitic ferrite, like upper bainite. Lower bainite, however, has a feature that regularly arranged fine carbides exist in lath bainitic ferrite.

Thus, upper bainite and lower bainite are distinguished depending on whether or not regularly arranged fine carbides exist in bainitic ferrite. This difference in carbide formation state in bainitic ferrite significantly influences the concentration of C into retained austenite and the hardness of bainite.

In the present disclosure, in the case where the area fraction of upper bainite is less than 5%, the concentration of C into austenite by upper bainite transformation does not progress sufficiently in the holding process after the second annealing, which causes a decrease in the amount of retained austenite exhibiting a TRIP effect in a high strain region during working. Besides, the fraction of non-transformed austenite in the holding process after the second annealing increases, and the fraction of martensite after cooling increases. Consequently, TS increases, but ductility and stretch flangeability decrease. Accordingly, the area fraction of upper bainite to the whole steel sheet microstructure needs to be 5% or more. If the area fraction of upper bainite is more than 45%, the fraction of ferrite advantageous for ductility decreases. Consequently, TS increases, but El decreases. The area fraction of upper bainite is therefore 45% or less. Thus, the area fraction of upper bainite is 5% or more and 45% or less. The area fraction of upper bainite is preferably 6% or more and 40% or less, and more preferably 7% or more and 35% or less.

[Area Fraction of Martensite: 1% or More and 20% or Less]

In the present disclosure, the area fraction of martensite needs to be 1% or more, in order to ensure the strength of the steel sheet. Meanwhile, the area fraction of martensite needs to be 20% or less, in order to ensure favorable ductility. The area fraction of martensite is preferably 15% or less, in order to ensure better ductility and stretch flangeability.

The area fractions of ferrite, upper bainite, and martensite can be determined by polishing a cross section of the steel sheet taken in the sheet thickness direction to be parallel to the rolling direction (L-cross section), etching the cross section with 1 vol. % nital, observing a position of sheet thickness×¼ (a position at a depth of one-fourth of the sheet thickness from the steel sheet surface) for three observation fields at 3000 magnifications using a scanning electron microscope (SEM), calculating the area fractions of constituent phases (ferrite, upper bainite, and martensite) for the three observation fields with Adobe Photoshop available from Adobe Systems Incorporated using the resultant structure micrographs, and averaging the results. In the structure micrographs, ferrite appears as a gray microstructure (matrix), martensite appears as a white microstructure, and upper bainite appears as a microstructure in which a white body is partially mixed in a gray base.

[Volume Fraction of Retained Austenite: 5% or More]

In the present disclosure, the amount of retained austenite needs to be 5% or more in volume fraction, in order to ensure favorable ductility and balance between strength and ductility. The amount of retained austenite is preferably 8% or more and further preferably 10% or more in volume fraction, in order to ensure better ductility and balance between strength and ductility. The upper limit of the amount of retained austenite is preferably 25% in volume fraction.

The volume fraction of retained austenite is determined by grinding/polishing the steel sheet in the sheet thickness direction to a depth of one-fourth of the sheet thickness and performing X-ray diffraction strength measurement. Co-Kα is used as incident X-rays, and the amount of retained austenite is calculated from the ratio of the intensity of each of the (200), (220), and (311) planes of austenite to the diffraction intensity of each of the (200) and (211) planes of ferrite.

[Average Grain Size of Retained Austenite: 2 μm or Less]

Refinement of retained austenite grains contributes to improved ductility of the steel sheet and stability as a material. The average grain size of retained austenite needs to be 2 μm or less, in order to ensure favorable ductility and stability as a material. The average grain size of retained austenite is preferably 1.5 μm or less, in order to ensure better ductility and stability as a material.

In the present disclosure, the average grain size of retained austenite can be determined by performing observation for 20 observation fields at 15000 magnifications using a transmission electron microscope (TEM), calculating the areas of the respective retained austenite grains in the resultant structure micrographs using Image-Pro available from Media Cybernetics and calculating the equivalent circular diameters, and averaging the results. The lower limit of the retained austenite grains to be measured is set to 10 nm in equivalent circular diameter, in terms of measurement limit.

In addition to the above-mentioned ferrite, upper bainite, martensite, and retained austenite, the microstructure according to the present disclosure may include tempered martensite, lower bainite, pearlite, carbides such as cementite, and other known steel sheet microstructures as long as their proportion is 5% or less in area fraction, without impairing the effects of the present disclosure.

The texture of the steel sheet is described below.

[Inverse Intensity Ratio of γ-Fiber to α-Fiber:3.0 or Less]

An α-fiber is a fiber texture in which the <110> axis is parallel to the rolling direction, while a γ-fiber is a fiber texture in which the <111> axis is parallel to the normal direction to the rolled surface. Body-centered cubic metals have a feature that α-fiber and γ-fiber develop by rolling deformation so intensely that their textures remain even after recrystallization annealing.

In the present disclosure, if the inverse intensity ratio of γ-fiber to α-fiber of the texture of the steel sheet is more than 3.0, the texture is oriented in a specific direction of the steel sheet, and the in-plane anisotropy in the mechanical properties, in particular the in-plane anisotropy of TS, increases. Accordingly, the inverse intensity ratio of γ-fiber to α-fiber of the texture of the steel sheet is 3.0 or less, and is preferably 2.5 or less.

No lower limit is placed on the inverse intensity ratio of γ-fiber to α-fiber, yet the inverse intensity ratio of γ-fiber to α-fiber is preferably 0.5 or more.

While a high-strength steel sheet obtained by a conventional, typical production method has an inverse intensity ratio of γ-fiber to α-fiber of about 3.0 to 4.0, this inverse intensity ratio can be appropriately reduced by performing annealing in an austenite single phase region in the first annealing according to the present disclosure.

The inverse intensity ratio of γ-fiber to α-fiber can be calculated as follows: Using wet polishing and buffing with a colloidal silica solution, the surface of a cross section (L-cross section) of the steel sheet taken in the sheet thickness direction parallel to the rolling direction is smoothed. The resultant sample surface is then etched with 0.1 vol. % nital so as to reduce irregularities on the surface as much as possible and completely remove the work affected layer. Following this, crystal orientation at a position of sheet thickness×¼ of the steel sheet (a position at a depth of one-fourth of the sheet thickness from the steel sheet surface) is measured using SEM-EBSD (Electron Backscatter Diffraction). Using OIM Analysis available from AMETEK EDAX, the inverse intensity of each of α-fiber and γ-fiber is determined from the obtained data, to calculate the inverse intensity ratio of γ-fiber to α-fiber.

A production method is described below.

The presently disclosed high-strength steel sheet is obtainable by the following process.

A steel slab having the above-described predetermined chemical composition is heated to 1100° C. or more and 1300° C. or less, hot rolled at a finisher delivery temperature of 800° C. or more and 1000° C. or less, and coiled at a coiling temperature of 300° C. or more and 700° C. or less. The resultant hot-rolled sheet is subjected to pickling treatment, and then optionally held in a temperature range of 450° C. or more and 800° C. or less for 900 s or more and 36000 s or less. Thereafter, the hot-rolled sheet is cold rolled with a rolling reduction of 30% or more. The obtained cold-rolled sheet is subjected to the first annealing treatment in a temperature range of Ti temperature or more and 950° C. or less, then cooled at an average cooling rate of 5° C./s or more at least to ($T_2$ temperature+100° C.), and then cooled to room temperature. Following this, the cold-rolled sheet is reheated to a temperature range of 740° C. or more and $T_1$ temperature or less to perform the second annealing treatment. Further, as primary cooling, the cold-rolled sheet is cooled to $T_2$ temperature or more and ($T_2$ temperature+ 150° C.) or less at a first average cooling rate of 8° C./s or more. Thereafter, as secondary cooling, the cold-rolled sheet is cooled to a cooling end temperature: 150° C. or more and ($T_2$ temperature−10° C.) or less at a second average cooling rate of 3° C./s or more, where the average cooling rate after the second annealing treatment is higher in the primary cooling than in the secondary cooling. The cold-rolled sheet is then reheated to a reheating temperature range of ($T_2$ temperature−50° C.) or more and ($T_2$ temperature+50° C.) or less. This reheating temperature is (cooling end temperature+5° C.) or more. The cold-rolled sheet is held in the reheating temperature range for 10 s or more.

A presently disclosed high-strength galvanized steel sheet can be produced by subjecting the above-described high-strength steel sheet to known galvanizing treatment.

Each production step is described below.

In the present disclosure, a steel slab having the above-described predetermined chemical composition is heated to 1100° C. or more and 1300° C. or less, hot rolled at a finisher delivery temperature of 800° C. or more and 1000° C. or less, and coiled at a coiling temperature of 300° C. or more and 700° C. or less.

[Heating Temperature of Steel Slab: 1100° C. or More and 1300° C. or Less]

Precipitates that are present at the time of heating of the steel slab will remain as coarse precipitates in the eventually obtained steel sheet, making no contribution to strength. Thus, remelting of any precipitates formed during casting is required.

In this respect, if the heating temperature of the steel slab is less than 1100° C., it is difficult to sufficiently melt precipitates, leading to problems such as an increased risk of trouble during hot rolling resulting from an increased rolling load. In addition, it is necessary to scale-off defects in the surface layer of the slab such as blow holes and segregation and reduce cracks and irregularities at the steel sheet surface, in order to achieve a smooth steel sheet surface. Besides, in the case where precipitates formed during casting remain as coarse precipitates without remelting, problems such as decreased ductility and stretch flangeability arise. Further, retained austenite may be unable to be formed effectively, causing a decrease in ductility. Accordingly, the heating temperature of the steel slab needs to be 1100° C. or more. If the heating temperature of the steel slab is more than 1300° C., scale loss increases as oxidation progresses. Accordingly, the heating temperature of the steel slab needs to be 1300° C. or less.

The heating temperature of the slab is therefore 1100° C. or more and 1300° C. or less. The heating temperature of the slab is preferably 1150° C. or more and 1280° C. or less, and further preferably 1150° C. or more and 1250° C. or less.

[Finisher Delivery Temperature: 800° C. or More and 1000° C. or Less]

The heated steel slab is hot rolled through rough rolling and finish rolling to form a hot-rolled steel sheet. If the finisher delivery temperature is more than 1000° C., the amount of oxides (scales) generated increases rapidly and the interface between the steel substrate and the oxides becomes rough, which tends to impair the surface quality after pickling and cold rolling. In addition, any hot-rolling scales remaining after pickling adversely affect ductility and stretch flangeability. Moreover, the grain size is excessively coarsened, causing surface deterioration in a pressed part during working.

If the finisher delivery temperature is less than 800° C., the rolling load and burden increase, and the rolling reduction in a state in which austenite is not recrystallized increases. As a result, an abnormal texture develops, which results in noticeable in-plane anisotropy in the final product. This not only impairs material homogeneity and stability as a material, but also decreases ductility itself.

Accordingly, the finisher delivery temperature in the hot rolling needs to be 800° C. or more and 1000° C. or less. The finisher delivery temperature is preferably 820° C. or more and 950° C. or less.

The steel slab is preferably produced by continuous casting to prevent macro segregation, yet may be produced by other methods such as ingot casting and thin slab casting. The steel slab thus produced may be cooled to room temperature and then heated again according to a conventional method. Moreover, after the production of the steel slab, energy-saving processes may be employed, such as hot direct rolling or direct rolling in which either a warm steel slab without being fully cooled to room temperature is charged into a heating furnace or a steel slab is rolled immediately after being subjected to heat retention for a short period. Further, while the steel slab is subjected to rough rolling under normal conditions to be formed into a sheet bar, in the case where the heating temperature is low, the sheet bar is preferably heated using a bar heater or the like prior to finish rolling in order to prevent troubles during hot rolling.

[Coiling Temperature after Hot Rolling: 300° C. or More and 700° C. or Less]

If the coiling temperature after the hot rolling is more than 700° C., the grain size of ferrite in the microstructure of the hot-rolled sheet increases, making it difficult to ensure desired strength and ductility of the final-annealed sheet. If the coiling temperature after the hot rolling is less than 300° C., the strength of the hot-rolled sheet increases, and the rolling load in the cold rolling increases, so that productivity decreases. Besides, cold rolling a hard hot-rolled sheet mainly composed of martensite tends to cause internal microcracking (embrittlement cracking) along prior austenite grain boundaries of martensite. Moreover, the grain size of the final-annealed sheet decreases and the fraction of hard phase increases. As a result, the ductility and stretch flangeability of the final-annealed sheet decrease. The coiling temperature after the hot rolling therefore needs to be 300° C. or more and 700° C. or less. The coiling temperature after the hot rolling is preferably 400° C. or more and 650° C. or less, and more preferably 400° C. or more and 600° C. or less.

Finish rolling may be performed continuously by joining rough-rolled sheets in the hot rolling. Rough-rolled sheets may be coiled on a temporary basis. At least part of finish rolling may be conducted as lubrication rolling to reduce the rolling load in the hot rolling. Such lubrication rolling is effective from the perspective of making the shape and material properties of the steel sheet uniform. The coefficient of friction in the lubrication rolling is preferably in a range of 0.10 to 0.25.

The hot-rolled steel sheet thus produced is subjected to pickling. Pickling enables removal of oxides from the steel sheet surface, and is thus important to ensure favorable chemical convertibility and coating quality in the high-strength steel sheet as the final product. Pickling may be performed in one or more batches.

After the pickling treatment, the steel sheet is optionally held in a temperature range of 450° C. or more and 800° C. or less for 900 s or more and 36000 s or less. The steel sheet is then cold rolled with a rolling reduction of 30% or more.

The obtained cold-rolled sheet is subjected to the first annealing treatment in a temperature range of $T_1$ temperature or more and 950° C. or less, then cooled at an average cooling rate of 5° C./s or more at least to ($T_2$ temperature+ 100° C.), and then cooled to room temperature.

[Heat Treatment Temperature Range and Holding Time after Hot-Rolled Sheet Pickling Treatment: Holding in Temperature Range of 450° C. or More and 800° C. or Less for 900 s or More and 36000 s or Less]

If the heat treatment temperature range is less than 450° C. or the heat treatment holding time is less than 900 s, tempering after the hot rolling is insufficient. This causes a mixed, non-uniform phase of ferrite, bainite, and martensite in the subsequent cold rolling. Due to such microstructure of the hot-rolled sheet, uniform refinement is insufficient. This results in an increase in the proportion of coarse martensite in the microstructure of the final-annealed sheet, and thus increases the non-uniformity of the microstructure, which may degrade the final-annealed sheet in terms of ductility, stretch flangeability, and stability as a material (in-plane anisotropy).

If the heat treatment holding time is more than 36000 s, productivity may be adversely affected. If the heat treatment temperature range is more than 800° C., a non-uniform, hardened, and coarse dual-phase microstructure of ferrite and either martensite or pearlite forms, increasing the non-uniformity of the microstructure before subjection to cold rolling. This results in an increase in the proportion of coarse martensite in the final-annealed sheet, which may degrade the final-annealed sheet in terms of ductility, stretch flangeability, and stability as a material.

Therefore, the heat treatment temperature range after the hot-rolled sheet pickling treatment needs to be 450° C. or more and 800° C. or less, and the holding time needs to be 900 s or more and 36000 s or less.

[Rolling Reduction in Cold Rolling: 30% or More]

If the rolling reduction in the cold rolling is less than 30%, the number of grain boundaries that act as nuclei for reverse transformation to austenite and the total number of dislocations per unit area decrease during the subsequent annealing, making it difficult to obtain the above-described resulting microstructure. In addition, if the microstructure becomes non-uniform, the ductility and in-plane anisotropy of the steel sheet decrease. Therefore, the rolling reduction in the cold rolling needs to be 30% or more. The rolling reduction in the cold rolling is preferably 35% or more, and more preferably 40% or more. The effects of the present disclosure can be achieved without limiting the number of rolling passes or the rolling reduction for each pass. No upper limit is placed on the rolling reduction, yet the upper limit is preferably about 80% in industrial terms.

[Temperature Range of First Annealing Treatment: $T_1$ Temperature or More and 950° C. or Less]

If the first annealing temperature range is less than $T_1$ temperature, then the heat treatment is performed in a ferrite-austenite dual phase region, with the result that a large amount of ferrite (polygonal ferrite) produced in the ferrite-austenite dual phase region will be included in the resulting microstructure. Hence, a desired amount of fine retained austenite cannot be formed, making it difficult to ensure favorable balance between strength and ductility. If the first annealing temperature is more than 950° C., austenite grains coarsen during the annealing, and fine retained austenite cannot be formed in the end. This makes it difficult to ensure favorable balance between strength and ductility, so that productivity decreases. Herein, Ti temperature denotes $Ac_3$ point.

The holding time of the first annealing treatment is not limited, but is preferably 10 s or more and 1000 s or less.

[Average Cooling Rate to ($T_2$ Temperature+100° C.) after First Annealing Treatment: 5° C./s or More]

If the average cooling rate to ($T_2$ temperature+100° C.) after the first annealing treatment is less than 5° C./s, ferrite and pearlite form during the cooling. Hence, in the microstructure prior to the second annealing, martensite single phase, bainite single phase, or martensite and bainite mixed phase cannot be obtained, and a desired amount of fine retained austenite cannot be formed in the end. This makes it difficult to ensure favorable balance between strength and ductility. Besides, the stability of the steel sheet as a material is impaired. Herein, $T_2$ temperature denotes an upper bainite transformation start temperature.

Accordingly, the average cooling rate to ($T_2$ temperature+ 100° C.) after the first annealing treatment is 5° C./s or more. The average cooling rate is preferably 8° C./s or more, more preferably 10° C./s or more, and further preferably 15° C./s or more. No upper limit is placed on the average cooling rate, yet in industrial terms, the average cooling rate is up to about 80° C./s.

The average cooling rate in a lower temperature range than ($T_2$ temperature+100° C.) is not limited, and the steel sheet is cooled to room temperature. The steel sheet may be passed through an overaging zone. The cooling method in the temperature range is not limited, and may be any of gas jet cooling, mist cooling, water cooling, and air cooling. The pickling may be performed according to a conventional process. If the average cooling rate to the room temperature or overaging zone is more than 80° C./s, the steel sheet shape may deteriorate. Accordingly, the average cooling rate is preferably 80° C./s or less, without being limited thereto.

The above-described first annealing treatment and subsequent cooling treatment enable the microstructure prior to the second annealing treatment to be mainly composed of martensite single phase, bainite single phase, or martensite and bainite mixed phase, as a result of which upper bainite can be effectively formed in the cooling, reheating, and holding processes after the second annealing described below. This secures an appropriate amount of fine retained austenite, and ensures favorable ductility.

In detail, since martensite single phase, bainite single phase, or martensite and bainite mixed phase formed as a result of the above-described first annealing treatment and subsequent cooling treatment forms a fine microstructure, the subsequently obtained retained austenite also forms a fine microstructure. The average grain size of retained austenite obtained according to the present disclosure is about 0.1 μm to 1.5 μm.

[Temperature Range of Second Annealing Treatment: 740° C. or More and $T_1$ Temperature or Less]

If the heating temperature in the second annealing temperature is less than 740° C., a sufficient amount of austenite cannot be obtained during the annealing, and a desired area fraction of martensite and volume fraction of retained austenite cannot be achieved in the end. This makes it difficult to ensure strength desired in the present disclosure and favorable balance between strength and ductility. If the second annealing temperature is more than $T_1$ temperature, the temperature range is that of austenite single phase, and a desired amount of fine retained austenite cannot be formed in the end. This makes it difficult to ensure favorable balance between strength and ductility. The holding time of the second annealing treatment is not limited, but is preferably 10 s or more and 1000 s or less.

[First Average Cooling Rate of Primary Cooling to $T_2$ Temperature or More and ($T_2$ Temperature+150° C.) or Less after Second Annealing Treatment: 8° C./s or More]

This is a very important control factor in the present disclosure. By setting the first average cooling rate of the primary cooling to $T_2$ temperature or more and ($T_2$ temperature+150° C.) or less after the second annealing treatment to 8° C./s or more, the driving force for upper bainite transformation in the holding process after the subsequent cooling and reheating can be increased. If the first average cooling rate of the primary cooling to $T_2$ temperature or more and ($T_2$ temperature+150° C.) or less after the second annealing treatment is less than 8° C./s, not only ferrite coarsens but also pearlite forms during the cooling, and a desired amount of fine retained austenite cannot be formed in the end. In addition, the C content in retained austenite decreases. This makes it difficult to ensure favorable balance between strength and ductility. Besides, the stability of the steel sheet as a material is impaired. Accordingly, the first average cooling rate of the primary cooling to $T_2$ temperature or more and ($T_2$ temperature+150° C.) or less after the second annealing treatment is 8° C./s or more. The first average cooling rate is preferably 10° C./s or more, more preferably 15° C./s or more, and further preferably 20° C./s or more. No upper limit is placed on the average cooling rate, yet in industrial terms, the average cooling rate is up to about 80° C./s.

[Second Average Cooling Rate of Secondary Cooling to 150° C. or More and ($T_2$ Temperature−10° C.) or Less after Second Annealing Treatment: 3° C./s or More]

If the second average cooling rate of the secondary cooling to 150° C. or more and ($T_2$ temperature−10° C.) or less after the second annealing treatment is less than 3° C./s, not only ferrite coarsens but also bainite and pearlite form during the cooling, and a desired amount of fine retained austenite cannot be formed in the end. This makes it difficult to ensure favorable balance between strength and ductility. Besides, the stability of the steel sheet as a material is impaired. Accordingly, the second average cooling rate of the secondary cooling to 150° C. or more and ($T_2$ temperature−10° C.) or less after the second annealing treatment is 3° C./s or more. The second average cooling rate is preferably 5° C./s or more, more preferably 10° C./s or more, and further preferably 15° C./s or more. No upper limit is placed on the average cooling rate, yet in industrial terms, the average cooling rate is up to about 80° C./s.

[Average Cooling Rate after Second Annealing Treatment: First Average Cooling Rate is Higher than Second Average Cooling Rate]

This is a very important control factor in the present disclosure. Regarding the average cooling rate after the second annealing treatment, if the first average cooling rate is not higher than the second average cooling rate, a sufficient driving force for upper bainite transformation in the holding process after the subsequent cooling and reheating cannot be obtained, and desired amounts of upper bainite and retained austenite cannot be ensured. Accordingly, the average cooling rate after the second annealing treatment is controlled so that the first average cooling rate is higher than the second average cooling rate. No upper limit is placed on the difference between the first average cooling rate and the second average cooling rate, yet in industrial terms, the difference is 50° C./s or less.

[Cooling End Temperature after Second Annealing Treatment: 150° C. or More and ($T_2$ Temperature−10° C.) or Less]

This is a very important control factor in the present disclosure. This cooling to ($T_2$ temperature−10° C.) or less is intended to increase the degree of undercooling of upper bainite transformation in the holding after the reheating. If the lower limit of the cooling end temperature after the second annealing treatment is less than 150° C., non-transformed austenite is almost entirely transformed into martensite at this point, so that desired amounts of upper bainite and retained austenite cannot be ensured. If the upper limit of the cooling end temperature after the second annealing treatment is more than ($T_2$ temperature−10° C.), the amounts of upper bainite and retained austenite defined in the present disclosure cannot be ensured. The cooling end temperature after the second annealing treatment is therefore 150° C. or more and ($T_2$ temperature−10° C.) or less.

[Reheating Temperature: ($T_2$ Temperature−50° C.) or More and ($T_2$ Temperature+50° C.) or Less]

This is a very important control factor in the present disclosure. If the reheating temperature is more than ($T_2$ temperature+50° C.), acicular ferrite forms preferentially during the holding after the reheating, making it difficult to ensure desired amounts of upper bainite and retained austenite. If the reheating temperature is less than ($T_2$ temperature−50° C.), lower bainite forms preferentially, making it difficult to ensure desired amounts of upper bainite and retained austenite. The reheating temperature is therefore ($T_2$ temperature−50° C.) or more and ($T_2$ temperature+50° C.) or less. The reheating temperature is preferably ($T_2$ temperature−40° C.) or more and ($T_2$ temperature+40° C.) or less.

[Reheating Temperature: (Cooling End Temperature after Second Annealing Treatment+5° C.) or More]

If the reheating temperature is less than (cooling end temperature+5° C.), the driving force for upper bainite transformation cannot be obtained, and desired amounts of upper bainite and retained austenite cannot be ensured. The reheating temperature is therefore (cooling end temperature+5° C.) or more. The temperature difference between the reheating temperature and the cooling end temperature has no upper limit, as long as the reheating temperature is not more than ($T_2$ temperature+50° C.) which is the upper limit temperature.

[Holding Time in Reheating Temperature Range: 10 s or More]

If the holding time in the reheating temperature range is less than 10 s, the time for the concentration of C into austenite to progress is insufficient, making it difficult to obtain a desired volume fraction of retained austenite in the end. The holding time in the reheating temperature range is therefore 10 s or more. If the holding time is more than 1000 s, the volume fraction of retained austenite does not increase and ductility does not improve significantly, where the effect is saturated. The holding time in the reheating temperature range is therefore preferably 1000 s or less.

Cooling after the holding is not limited, and any method may be used to cool the steel sheet to a desired temperature. The desired temperature is preferably around room temperature.

[Galvanizing Treatment]

In the case of performing hot-dip galvanizing treatment, the steel sheet subjected to the above-described annealing treatment is immersed in a galvanizing bath at 440° C. or more and 500° C. or less for hot-dip galvanizing, after which coating weight adjustment is performed using gas wiping or the like. For hot-dip galvanizing, a galvanizing bath with a Al content of 0.10 mass % or more and 0.23 mass % or less is preferably used. When a galvanized layer is subjected to alloying treatment, the alloying treatment is performed on the galvanized layer in a temperature range of 470° C. to 600° C. after the hot-dip galvanizing treatment. If the alloying treatment is performed at a temperature of more than 600° C., untransformed austenite transforms to pearlite, where a desired volume fraction of retained austenite cannot be ensured and El may decrease. Therefore, when a galvanized layer is subjected to alloying treatment, the alloying treatment is preferably performed on the galvanized layer in a temperature range of 470° C. to 600° C. Electrogalvanization may be performed. The coating weight is preferably 20 g/m$^2$ to 80 g/m$^2$ per side (in the case of both-sided coating). A galvannealed steel sheet (GA) is preferably subjected to alloying treatment so that the Fe concentration in the coated layer is 7 mass % to 15 mass %.

When skin pass rolling is performed after the heat treatment, the skin pass rolling is preferably performed with a rolling reduction of 0.1% or more and 2.0% or less. A rolling reduction of less than 0.1% is not very effective and complicates control, and hence 0.1% is the lower limit of the favorable range. A rolling reduction of more than 2.0% significantly decreases productivity, and thus 2.0% is the upper limit of the favorable range.

The skin pass rolling may be performed on-line or off-line. Skin pass may be performed in one or more batches with a target rolling reduction. No particular limitations are placed on other manufacturing conditions, yet from the perspective of productivity, the aforementioned series of processes such as annealing, hot-dip galvanizing, and alloying treatment on a galvanized layer are preferably carried out on a CGL (Continuous Galvanizing Line) as a hot-dip galvanizing line. After the hot-dip galvanizing, wiping may be performed to adjust the coating amount. Conditions other than the above, such as coating conditions, may be determined in accordance with conventional hot-dip galvanizing methods.

EXAMPLES

Example 1

Steels having the chemical compositions listed in Table 1, each with the balance being Fe and inevitable impurities, were prepared by steelmaking in a converter and formed into slabs by continuous casting. The slabs thus obtained were heated and hot rolled under the conditions listed in Table 2, and then subjected to pickling treatment. Nos. 1 to 11, 13 to 26, 28, 30, 32, 33, 35 to 40, 42, and 44 in Table 2 were subjected to hot-rolled sheet heat treatment. Of these, Nos. 32, 33, 35 to 40, 42, and 44 were subjected to pickling treatment after the hot-rolled sheet heat treatment.

Cold rolling was then performed under the conditions listed in Table 2. Subsequently, annealing treatment was conducted twice under the conditions listed in Table 3, to produce high-strength cold-rolled steel sheets (CR).

Moreover, some of the high-strength cold-rolled steel sheets (CR) were subjected to galvanizing treatment to obtain hot-dip galvanized steel sheets (GI), galvannealed steel sheets (GA), electrogalvanized steel sheets (EG), and so on. Used as hot-dip galvanizing baths were a zinc bath containing 0.14 mass % or 0.19 mass % of Al for GI and a zinc bath containing 0.14 mass % of Al for GA, and in each case the bath temperature was 470° C. The coating weight per side was 72 g/m$^2$ or 45 g/m$^2$ in GI (in the case of both-sided coating), and 45 g/m$^2$ in GA (in the case of both-sided coating). The Fe concentration in the coated layer of each hot-dip galvannealed steel sheet (GA) was 9 mass % or more and 12 mass % or less.

The $T_1$ temperature (° C.) was calculated using the following equation:

$$T_1 \text{ temperature}(° C.)=946-203\times[\% C]^{1/2}+45\times[\% Si]-30\times[\% Mn]+150\times[\% Al]-20\times[\% Cu]+11\times[\% Cr]+400\times[\% Ti].$$

The $T_2$ temperature (° C.) can be calculated as follows:

$$T_2 \text{ temperature}(° C.)=740-490\times[\% C]-100\times[\% Mn]-70\times[\% Cr].$$

Herein, [% X] denotes the content of element X in a steel sheet in mass %, and is 0 for any element not contained.

The $T_1$ temperature denotes the $Ac_3$ point, and the $T_2$ temperature denotes the upper bainite transformation start temperature.

The mechanical properties of the obtained high-strength cold-rolled steel sheets (CR), hot-dip galvanized steel sheets (GI), galvannealed steel sheets (GA), and electrogalvanized steel sheet (EG) as steels under test were evaluated. The mechanical properties were evaluated by a tensile test and a hole expanding test as follows.

The tensile test was performed in accordance with JIS Z 2241 (2011) to measure TS (tensile strength) and El (total elongation), using JIS No. 5 test pieces collected so that the longitudinal direction of each tensile test piece coincided with three directions: the rolling direction (L direction) of the steel sheet, the direction (D direction) of 45° with respect to the rolling direction of the steel sheet, and the direction (C direction) orthogonal to the rolling direction of the steel sheet. Herein, ductility, i.e. El, was determined as excellent in the case where the value of TS×El was 19000 MPa·% or more. The in-plane anisotropy of TS was determined as excellent in the case where the value of |ΔTS|, which is an index of in-plane anisotropy of TS, was 50 MPa or less.

The hole expansion test was performed in accordance with JIS Z 2256 (2010). Each of the obtained steel sheets was cut to a sample size of 100 mm×100 mm, and a hole with a diameter of 10 mm was drilled through each sample with clearance 12%±1%. Subsequently, each steel sheet was clamped into a die having an inner diameter of 75 mm with a blank holding force of 9 tons (88.26 kN). In this state, a conical punch of 60° was pushed into the hole, and the hole diameter at crack initiation limit was measured. The maximum hole expansion ratio λ (%) was calculated by the following equation to evaluate hole expansion formability:

$$\lambda(\%)=\{(D_f-D_0)/D_0\}\times 100 \quad \text{maximum hole expansion ratio}$$

where $D_f$ is a hole diameter at the time of occurrence of cracking (mm) and $D_0$ is an initial hole diameter (mm). Herein, the stretch flangeability was determined as excellent in the case where the maximum hole expansion ratio λ, which is an index of stretch flangeability, was 20% or more regardless of the strength of the steel sheet.

In addition, the area fractions of ferrite (F), upper bainite (UB), and martensite (M), the volume fraction and average grain size of retained austenite (RA), and the inverse intensity ratio of γ-fiber to α-fiber at a position of sheet thickness × ¼ of the steel sheet were calculated according to the above-described methods.

The results of examining the steel sheet microstructure of each steel sheet in this way are listed in Table 4. The results of measuring the mechanical properties of each steel sheet are listed in Table 5.

TABLE 1

| Steel sample ID | Chemical composition (mass %) | | | | | | | | | | | |
|---|---|---|---|---|---|---|---|---|---|---|---|---|
| | C | Si | Mn | P | S | N | Al | Ti | Nb | V | B | Cr |
| A | 0.252 | 1.10 | 2.06 | 0.016 | 0.0036 | 0.0028 | — | — | — | — | — | — |
| B | 0.277 | 1.51 | 1.87 | 0.020 | 0.0043 | 0.0045 | — | — | — | — | — | — |
| C | 0.225 | 1.15 | 2.12 | 0.038 | 0.0033 | 0.0049 | — | — | — | — | — | — |
| D | 0.180 | 1.90 | 2.08 | 0.013 | 0.0011 | 0.0015 | — | — | — | — | — | — |
| E | 0.205 | 1.08 | 2.65 | 0.022 | 0.0011 | 0.0041 | — | — | — | — | — | — |
| F | 0.147 | 1.21 | 2.03 | 0.048 | 0.0018 | 0.0048 | — | — | — | — | — | — |
| G | 0.152 | 1.03 | 1.89 | 0.048 | 0.0026 | 0.0044 | — | — | — | — | — | — |
| H | 0.059 | 1.97 | 2.10 | 0.046 | 0.0010 | 0.0032 | — | — | — | — | — | — |
| I | 0.213 | 0.38 | 2.68 | 0.044 | 0.0028 | 0.0036 | — | — | — | — | — | — |
| J | 0.185 | 0.80 | 1.29 | 0.015 | 0.0016 | 0.0049 | — | — | — | — | — | — |
| K | 0.193 | 0.82 | 3.28 | 0.023 | 0.0030 | 0.0046 | — | — | — | — | — | — |
| L | 0.229 | 1.31 | 1.80 | 0.045 | 0.0034 | 0.0037 | 0.256 | — | — | — | — | — |
| M | 0.248 | 1.88 | 1.64 | 0.027 | 0.0038 | 0.0014 | — | 0.052 | — | — | — | — |
| N | 0.229 | 1.05 | 2.21 | 0.013 | 0.0038 | 0.0035 | — | — | 0.036 | 0.014 | — | — |
| O | 0.202 | 1.16 | 1.81 | 0.017 | 0.0046 | 0.0038 | — | — | — | — | 0.0021 | — |
| P | 0.207 | 1.71 | 2.03 | 0.020 | 0.0030 | 0.0044 | — | — | — | — | — | 0.19 |
| Q | 0.246 | 0.98 | 2.23 | 0.017 | 0.0025 | 0.0015 | — | — | — | — | — | — |
| R | 0.188 | 1.83 | 2.33 | 0.017 | 0.0036 | 0.0047 | — | — | — | — | — | — |
| S | 0.240 | 1.04 | 2.25 | 0.044 | 0.0013 | 0.0012 | — | — | — | — | — | — |
| T | 0.205 | 1.12 | 1.82 | 0.010 | 0.0048 | 0.0017 | — | — | — | — | — | — |
| U | 0.186 | 1.44 | 2.61 | 0.019 | 0.0027 | 0.0049 | — | — | 0.044 | — | — | — |
| V | 0.193 | 1.46 | 1.57 | 0.043 | 0.043 | 0.0027 | — | — | 0.018 | — | — | — |
| W | 0.225 | 1.94 | 2.29 | 0.024 | 0.0033 | 0.0017 | — | — | 0.035 | — | — | — |
| X | 0.228 | 0.85 | 1.94 | 0.029 | 0.0046 | 0.0032 | — | — | — | — | — | — |
| Y | 0.279 | 1.63 | 1.81 | 0.026 | 0.0047 | 0.0022 | — | — | — | — | — | — |
| Z | 0.142 | 0.97 | 2.20 | 0.021 | 0.0018 | 0.0025 | — | — | — | — | — | — |

| Steel sample ID | Chemical composition (mass %) | | | | | | | $T_1$ temperature (° C.) | $T_2$ temperature (° C.) | Remarks |
|---|---|---|---|---|---|---|---|---|---|---|
| | Cu | Sb | Sn | Ta | Ca | Mg | REM | | | |
| A | — | — | — | — | — | — | — | 832 | 411 | Disclosed steel |
| B | — | — | — | — | — | — | — | 851 | 418 | Disclosed steel |
| C | — | — | — | — | — | — | — | 838 | 418 | Disclosed steel |
| D | — | — | — | — | — | — | — | 883 | 444 | Disclosed steel |
| E | — | — | — | — | — | — | — | 823 | 374 | Disclosed steel |
| F | — | — | — | — | — | — | — | 862 | 465 | Disclosed steel |
| G | — | — | — | — | — | — | — | 857 | 477 | Disclosed steel |
| H | — | — | — | — | — | — | — | 922 | 501 | Comparative steel |
| I | — | — | — | — | — | — | — | 789 | 368 | Comparative steel |
| J | — | — | — | — | — | — | — | 856 | 520 | Comparative steel |
| K | — | — | — | — | — | — | — | 795 | 317 | Comparative steel |
| L | — | — | — | — | — | — | — | 893 | 448 | Disclosed steel |
| M | — | — | — | — | — | — | — | 901 | 455 | Disclosed steel |
| N | — | — | — | — | — | — | — | 830 | 407 | Disclosed steel |
| O | — | — | — | — | — | — | — | 852 | 460 | Disclosed steel |
| P | — | — | — | — | — | — | — | 872 | 423 | Disclosed steel |
| Q | 0.23 | — | — | — | — | — | — | 818 | 396 | Disclosed steel |
| R | — | 0.0052 | — | — | — | — | — | 871 | 415 | Disclosed steel |
| S | — | — | 0.0051 | — | — | — | — | 826 | 397 | Disclosed steel |
| T | — | — | — | 0.0036 | — | — | — | 850 | 457 | Disclosed steel |
| U | — | 0.0058 | — | — | — | — | — | 845 | 388 | Disclosed steel |
| V | — | — | 0.0049 | — | — | — | — | 875 | 488 | Disclosed steel |
| W | — | — | — | 0.0055 | — | — | — | 869 | 401 | Disclosed steel |
| X | — | — | — | — | 0.0030 | — | — | 829 | 434 | Disclosed steel |
| Y | — | — | — | — | — | 0.0029 | — | 858 | 422 | Disclosed steel |
| Z | — | — | — | — | — | — | 0.0032 | 847 | 451 | Disclosed steel |

Underlines indicate outside presently disclosed range.

TABLE 2

| No. | Steel sample ID | Slab heating temperature (° C.) | Finisher delivery temperature (° C.) | Coiling temperature (° C.) | Heat treatment temperature (° C.) | Heat treatment time (s) | Rolling reduction in cold rolling (%) | Remarks |
|---|---|---|---|---|---|---|---|---|
| 1 | A | 1270 | 870 | 510 | 500 | 22000 | 53 | Example |
| 2 | B | 1260 | 880 | 480 | 550 | 24000 | 60 | Example |
| 3 | C | 1200 | 880 | 590 | 520 | 18000 | 65 | Example |
| 4 | C | <u>1030</u> | 860 | 490 | 530 | 16000 | 56 | Comparative Example |
| 5 | C | 1230 | <u>780</u> | 510 | 530 | 23000 | 60 | Comparative Example |
| 6 | C | 1240 | <u>1070</u> | 530 | 550 | 10000 | 51 | Comparative Example |
| 7 | C | 1250 | 880 | <u>250</u> | 600 | 18000 | 47 | Comparative Example |
| 8 | C | 1220 | 910 | <u>770</u> | 520 | 30000 | 63 | Comparative Example |
| 9 | C | 1210 | 860 | 480 | 500 | 16000 | <u>25</u> | Comparative Example |
| 10 | C | 1160 | 880 | 550 | 500 | 20000 | 57 | Comparative Example |
| 11 | C | 1200 | 910 | 480 | 490 | 15000 | 50 | Comparative Example |
| 12 | C | 1210 | 880 | 560 | — | — | 52 | Comparative Example |
| 13 | C | 1230 | 900 | 450 | 580 | 20000 | 59 | Comparative Example |
| 14 | C | 1220 | 890 | 540 | 550 | 26000 | 58 | Comparative Example |
| 15 | C | 1190 | 900 | 440 | 540 | 20000 | 55 | Comparative Example |
| 16 | C | 1180 | 920 | 460 | 550 | 22000 | 50 | Comparative Example |
| 17 | C | 1200 | 890 | 550 | 560 | 18000 | 59 | Comparative Example |
| 18 | C | 1220 | 870 | 410 | 560 | 10000 | 57 | Comparative Example |
| 19 | C | 1250 | 880 | 520 | 550 | 18000 | 63 | Comparative Example |
| 20 | C | 1260 | 900 | 430 | 550 | 23000 | 48 | Comparative Example |
| 21 | C | 1240 | 880 | 580 | 530 | 21000 | 48 | Comparative Example |
| 22 | D | 1120 | 870 | 570 | 600 | 22000 | 50 | Example |
| 23 | E | 1130 | 850 | 420 | 620 | 25000 | 57 | Example |
| 24 | F | 1230 | 980 | 570 | 590 | 26000 | 38 | Example |
| 25 | G | 1210 | 870 | 660 | 550 | 24000 | 59 | Example |
| 26 | H | 1240 | 850 | 560 | 490 | 5000 | 52 | Comparative Example |
| 27 | I | 1250 | 880 | 540 | — | — | 65 | Comparative Example |
| 28 | J | 1260 | 910 | 440 | 570 | 12000 | 75 | Comparative Example |
| 29 | K | 1270 | 900 | 510 | — | — | 50 | Comparative Example |
| 30 | L | 1220 | 900 | 500 | 560 | 18000 | 46 | Example |
| 31 | M | 1230 | 890 | 560 | — | — | 53 | Example |
| 32 | N | 1260 | 860 | 460 | 560 | 18000 | 52 | Example |
| 33 | O | 1270 | 890 | 470 | 480 | 23000 | 47 | Example |
| 34 | P | 1240 | 880 | 560 | — | — | 56 | Example |
| 35 | Q | 1250 | 860 | 520 | 500 | 14000 | 55 | Example |
| 36 | R | 1250 | 850 | 520 | 520 | 20000 | 59 | Example |
| 37 | S | 1240 | 920 | 490 | 490 | 15000 | 63 | Example |
| 38 | T | 1230 | 910 | 520 | 530 | 11000 | 40 | Example |
| 39 | U | 1250 | 890 | 530 | 710 | 27000 | 48 | Example |
| 40 | V | 1260 | 880 | 510 | 500 | 34000 | 32 | Example |
| 41 | W | 1180 | 860 | 350 | — | — | 49 | Example |
| 42 | X | 1250 | 820 | 450 | 550 | 29000 | 44 | Example |
| 43 | Y | 1290 | 910 | 430 | — | — | 61 | Example |
| 44 | Z | 1120 | 940 | 480 | 600 | 24000 | 59 | Example |

Underlines indicate outside presently disclosed range.

TABLE 3

| | | First annealing treatment | | Second annealing treatment | | | | | | | |
|---|---|---|---|---|---|---|---|---|---|---|---|
| No. | Steel sample ID | Annealing temperature (° C.) | Average cooling rate to $T_2$ temperature + 100° C. (° C./s) | Annealing temperature (° C.) | First average cooling rate (° C./s) | Second average cooling rate (° C./s) | Cooling end temperature (° C.) | Reheating temperature (° C.) | Reheating holding time (s) | Type* | Remarks |
| 1 | A | 845 | 22 | 820 | 19 | 15 | 350 | 420 | 180 | CR | Example |
| 2 | B | 870 | 26 | 790 | 18 | 17 | 300 | 450 | 150 | GI | Example |
| 3 | C | 890 | 28 | 790 | 29 | 14 | 240 | 440 | 180 | GA | Example |
| 4 | C | 900 | 26 | 790 | 33 | 18 | 390 | 410 | 230 | CR | Comparative Example |
| 5 | C | 910 | 27 | 780 | 20 | 15 | 360 | 380 | 180 | CR | Comparative Example |
| 6 | C | 840 | 21 | 770 | 20 | 12 | 340 | 410 | 300 | CR | Comparative Example |
| 7 | C | 840 | 21 | 780 | 25 | 10 | 220 | 420 | 180 | GI | Comparative Example |
| 8 | C | 920 | 28 | 825 | 18 | 12 | 180 | 450 | 150 | CR | Comparative Example |
| 9 | C | 880 | 25 | 825 | 19 | 10 | 200 | 450 | 240 | CR | Comparative Example |

TABLE 3-continued

| | | First annealing treatment | | Second annealing treatment | | | | | | | |
|---|---|---|---|---|---|---|---|---|---|---|---|
| No. | Steel sample ID | Annealing temperature (° C.) | Average cooling rate to $T_2$ temperature + 100° C. (° C./s) | Annealing temperature (° C.) | First average cooling rate (° C./s) | Second average cooling rate (° C./s) | Cooling end temperature (° C.) | Reheating temperature (° C.) | Reheating holding time (s) | Type* | Remarks |
| 10 | C | <u>760</u> | 17 | 820 | 24 | 13 | 215 | 440 | 260 | EG | Comparative Example |
| 11 | C | <u>1045</u> | 28 | 830 | 16 | 10 | 260 | 380 | 230 | CR | Comparative Example |
| 12 | C | 870 | <u>4</u> | 800 | 17 | 11 | 380 | 430 | 210 | CR | Comparative Example |
| 13 | C | 910 | 27 | <u>710</u> | 20 | 16 | 400 | 410 | 180 | CR | Comparative Example |
| 14 | C | 840 | 26 | <u>880</u> | 28 | 19 | 390 | 405 | 200 | CR | Comparative Example |
| 15 | C | 860 | 23 | 820 | <u>5</u> | 3 | 250 | 380 | 350 | CR | Comparative Example |
| 16 | C | 870 | 20 | 825 | <u>14</u> | <u>20</u> | 290 | 390 | 200 | CR | Comparative Example |
| 17 | C | 870 | 24 | 800 | 21 | 15 | <u>100</u> | 380 | 180 | CR | Comparative Example |
| 18 | C | 850 | 20 | 805 | 20 | 16 | <u>580</u> | 400 | 210 | CR | Comparative Example |
| 19 | C | 845 | 19 | 780 | 22 | 15 | 380 | <u>360</u> | 280 | GI | Comparative Example |
| 20 | C | 840 | 23 | 825 | 26 | 20 | 390 | <u>605</u> | 200 | CR | Comparative Example |
| 21 | C | 850 | 21 | 800 | 20 | 14 | 375 | 410 | <u>8</u> | GA | Comparative Example |
| 22 | D | 890 | 22 | 810 | 25 | 8 | 360 | 410 | 500 | GA | Example |
| 23 | E | 845 | 21 | 800 | 23 | 5 | 330 | 370 | 400 | GI | Example |
| 24 | F | 945 | 25 | 840 | 29 | 19 | 300 | 430 | 190 | EG | Example |
| 25 | G | 860 | 18 | 770 | 32 | 20 | 180 | 440 | 880 | CR | Example |
| 26 | H | 950 | 20 | 820 | 31 | 22 | 320 | 455 | 240 | CR | Comparative Example |
| 27 | I | 840 | 28 | 780 | 17 | 14 | 390 | 400 | 350 | EG | Comparative Example |
| 28 | J | 880 | 27 | 760 | 37 | 19 | 360 | 480 | 500 | CR | Comparative Example |
| 29 | K | 930 | 34 | 790 | 16 | 13 | 300 | 350 | 600 | EG | Comparative Example |
| 30 | L | 900 | 25 | 890 | 30 | 15 | 420 | 435 | 210 | GI | Example |
| 31 | M | 930 | 25 | 825 | 45 | 25 | 395 | 420 | 200 | CR | Example |
| 32 | N | 880 | 27 | 800 | 25 | 20 | 380 | 430 | 200 | GA | Example |
| 33 | O | 875 | 27 | 790 | 30 | 16 | 200 | 500 | 220 | CR | Example |
| 34 | P | 880 | 25 | 820 | 26 | 18 | 260 | 400 | 3000 | CR | Example |
| 35 | Q | 850 | 28 | 770 | 14 | 5 | 230 | 385 | 240 | EG | Example |
| 36 | R | 880 | 15 | 750 | 22 | 18 | 250 | 380 | 400 | CR | Example |
| 37 | S | 855 | 9 | 820 | 31 | 25 | 280 | 360 | 550 | GI | Example |
| 38 | T | 890 | 19 | 800 | 29 | 23 | 390 | 430 | 900 | EG | Example |
| 39 | U | 900 | 25 | 810 | 21 | 15 | 200 | 370 | 350 | GI | Example |
| 40 | V | 880 | 23 | 840 | 20 | 16 | 180 | 450 | 260 | EG | Example |
| 41 | W | 900 | 18 | 800 | 18 | 13 | 255 | 410 | 780 | CR | Example |
| 42 | X | 880 | 20 | 780 | 16 | 10 | 290 | 440 | 220 | GA | Example |
| 43 | Y | 860 | 16 | 810 | 22 | 12 | 320 | 390 | 490 | GI | Example |
| 44 | Z | 865 | 15 | 820 | 26 | 14 | 370 | 420 | 300 | CR | Example |

Underlines indicate outside presently disclosed range.
*CR: cold-rolled steel sheet (no coating), GI: hot-dip galvanized steel sheet (no alloying treatment of galvanized coating), GA: galvannealed steel sheet, EG: electrogalvanized steel sheet

TABLE 4

| No. | Steel sample ID | Sheet thickness (mm) | Area fraction of F (%) | Area fraction of UB (%) | Area fraction of M (%) | Volume fraction of RA (%) | Average grain size of RA (μm) | Inverse intensity ratio of γ-fber to α-fiber | Residual microstructure | Remarks |
|---|---|---|---|---|---|---|---|---|---|---|
| 1 | A | 1.2 | 35.0 | 34.7 | 10.2 | 11.9 | 1.0 | 1.0 | 0 | Example |
| 2 | B | 1.3 | 32.5 | 34.3 | 14.5 | 9.4 | 1.0 | 1.4 | 0 | Example |
| 3 | C | 1.4 | 30.1 | 38.8 | 8.2 | 14.2 | 0.7 | 1.1 | 0 | Example |
| 4 | C | 1.2 | 35.0 | 34.5 | 13.1 | <u>4.0</u> | 1.3 | 1.2 | 0 | Comparative Example |
| 5 | C | 1.3 | 29.8 | 35.0 | 14.4 | 12.8 | 1.1 | <u>6.6</u> | 0 | Comparative Example |
| 6 | C | 1.1 | 29.8 | 22.1 | <u>36.5</u> | <u>0.7</u> | 0.5 | 1.8 | 0 | Comparative Example |
| 7 | C | 1.0 | <u>19.2</u> | 30.3 | <u>29.6</u> | 10.9 | 0.8 | 2.4 | 0 | Comparative Example |
| 8 | C | 1.4 | <u>56.4</u> | 11.3 | <u>20.2</u> | <u>2.4</u> | 0.1 | 0.9 | 0 | Comparative Example |
| 9 | C | 0.6 | 37.7 | 31.5 | 13.2 | 10.2 | 1.4 | <u>7.3</u> | 0 | Comparative Example |
| 10 | C | 1.3 | 39.8 | 34.1 | 12.4 | <u>2.8</u> | 1.4 | <u>5.6</u> | 0 | Comparative Example |
| 11 | C | 1.1 | 37.7 | 34.8 | 14.4 | <u>4.5</u> | 0.5 | 1.3 | 0 | Comparative Example |
| 12 | C | 1.1 | 36.6 | 33.2 | 13.5 | <u>4.9</u> | 1.0 | 2.2 | 0 | Comparative Example |
| 13 | C | 1.3 | 38.0 | 33.6 | 14.3 | <u>1.2</u> | 1.7 | 2.1 | 0 | Comparative Example |
| 14 | C | 1.3 | 38.1 | 34.4 | 14.4 | <u>4.0</u> | <u>2.9</u> | 2.0 | 0 | Comparative Example |
| 15 | C | 1.2 | 39.3 | 34.8 | 13.2 | <u>0.7</u> | 0.9 | 2.5 | 0 | Comparative Example |
| 16 | C | 1.1 | 38.8 | 33.2 | 14.4 | <u>3.5</u> | 0.5 | 2.1 | 0 | Comparative Example |
| 17 | C | 1.3 | 39.5 | <u>4.9</u> | <u>37.5</u> | <u>0.8</u> | 1.0 | 2.0 | TM + θ | Comparative Example |
| 18 | C | 1.3 | <u>67.9</u> | <u>4.9</u> | <u>0.0</u> | 4.9 | 0.8 | 1.0 | P + θ | Comparative Example |

TABLE 4-continued

| No. | Steel sample ID | Sheet thickness (mm) | Area fraction of F (%) | Area fraction of UB (%) | Area fraction of M (%) | Volume fraction of RA (%) | Average grain size of RA (μm) | Inverse intensity ratio of γ-fber to α-fiber | Residual micro-structure | Remarks |
|---|---|---|---|---|---|---|---|---|---|---|
| 19 | C | 1.4 | 39.6 | 3.6 | 42.3 | 4.8 | 0.5 | 2.0 | 0 | Comparative Example |
| 20 | C | 1.1 | 56.6 | 1.6 | 8.1 | 20.3 | 0.1 | 2.4 | AF + P + θ | Comparative Example |
| 21 | C | 1.1 | 39.6 | 4.3 | 40.4 | 4.7 | 1.2 | 1.5 | 0 | Comparative Example |
| 22 | D | 1.1 | 34.6 | 30.7 | 13.5 | 10.6 | 1.1 | 1.5 | 0 | Example |
| 23 | E | 1.3 | 36.0 | 32.4 | 14.7 | 8.1 | 0.6 | 1.8 | 0 | Example |
| 24 | F | 0.8 | 35.7 | 37.8 | 7.0 | 15.2 | 1.2 | 2.0 | 0 | Example |
| 25 | G | 1.3 | 37.6 | 36.3 | 1.1 | 15.5 | 0.6 | 2.2 | 0 | Example |
| 26 | H | 1.1 | 59.4 | 13.0 | 7.1 | 11.0 | 1.0 | 2.0 | 0 | Comparative Example |
| 27 | I | 1.4 | 18.9 | 36.0 | 18.3 | 12.6 | 1.1 | 1.5 | 0 | Comparative Example |
| 28 | J | 1.7 | 51.0 | 11.0 | 9.3 | 21.2 | 0.0 | 2.5 | 0 | Comparative Example |
| 29 | K | 1.1 | 18.8 | 39.9 | 13.6 | 12.6 | 1.3 | 2.7 | LB + θ | Comparative Example |
| 30 | L | 1.0 | 33.4 | 10.6 | 12.6 | 6.6 | 1.6 | 1.2 | 0 | Example |
| 31 | M | 1.2 | 25.7 | 36.3 | 9.4 | 19.2 | 1.1 | 2.3 | 0 | Example |
| 32 | N | 1.1 | 49.6 | 15.0 | 18.7 | 5.2 | 0.5 | 2.3 | 0 | Example |
| 33 | O | 1.0 | 34.7 | 38.0 | 4.1 | 14.5 | 0.0 | 1.5 | 0 | Example |
| 34 | P | 1.2 | 33.0 | 37.1 | 3.3 | 19.6 | 0.3 | 1.9 | 0 | Example |
| 35 | Q | 1.2 | 36.3 | 34.4 | 10.4 | 6.7 | 0.9 | 2.5 | 0 | Example |
| 36 | R | 1.3 | 39.8 | 28.6 | 11.4 | 6.7 | 1.5 | 1.0 | LB + θ | Example |
| 37 | S | 1.4 | 35.9 | 30.9 | 14.0 | 6.9 | 1.1 | 0.7 | 0 | Example |
| 38 | T | 0.9 | 30.9 | 37.0 | 9.2 | 17.1 | 1.4 | 1.8 | 0 | Example |
| 39 | U | 1.1 | 44.8 | 14.6 | 19.9 | 7.8 | 0.9 | 1.6 | 0 | Example |
| 40 | V | 0.7 | 38.0 | 38.0 | 10.2 | 6.5 | 0.9 | 1.4 | 0 | Example |
| 41 | W | 1.1 | 34.0 | 39.9 | 12.1 | 8.1 | 0.5 | 1.5 | 0 | Example |
| 42 | X | 1.0 | 29.7 | 36.1 | 13.3 | 13.1 | 1.1 | 1.5 | 0 | Example |
| 43 | Y | 1.3 | 40.0 | 13.7 | 19.1 | 13.9 | 0.6 | 1.4 | 0 | Example |
| 44 | Z | 1.3 | 49.0 | 14.2 | 9.2 | 14.9 | 0.6 | 2.1 | LB + θ | Example |

Underlines indicate outside presently disclosed range.
F: ferrite, UB: upper bainite, M: martensite, TM: tempered martensite, RA: retained austenite, P: pearlite, LB: lower bainite, θ: cementite, AF: acicular ferrite

TABLE 5

| No. | Steel sample ID | TS (MPa) | El (%) | λ (%) | TS × El (MPa · %) | |ΔTS| (MPa) | Remarks |
|---|---|---|---|---|---|---|---|
| 1 | A | 1132 | 21.8 | 36 | 24678 | 47 | Example |
| 2 | B | 1098 | 21.7 | 40 | 23827 | 48 | Example |
| 3 | C | 984 | 30.0 | 48 | 29520 | 46 | Example |
| 4 | C | 1030 | 17.1 | 11 | 17613 | 36 | Comparative Example |
| 5 | C | 1068 | 15.2 | 35 | 16234 | 81 | Comparative Example |
| 6 | C | 1071 | 16.2 | 7 | 17350 | 43 | Comparative Example |
| 7 | C | 1035 | 15.7 | 11 | 16250 | 38 | Comparative Example |
| 8 | C | 760 | 36.1 | 46 | 27436 | 46 | Comparative Example |
| 9 | C | 1003 | 16.5 | 25 | 16550 | 88 | Comparative Example |
| 10 | C | 980 | 17.7 | 16 | 17346 | 62 | Comparative Example |
| 11 | C | 969 | 18.4 | 14 | 17830 | 42 | Comparative Example |
| 12 | C | 950 | 17.6 | 17 | 16720 | 77 | Comparative Example |
| 13 | C | 968 | 17.6 | 18 | 17037 | 37 | Comparative Example |
| 14 | C | 1049 | 15.7 | 47 | 16469 | 44 | Comparative Example |
| 15 | C | 1058 | 17.3 | 14 | 18303 | 87 | Comparative Example |
| 16 | C | 968 | 18.5 | 10 | 17908 | 74 | Comparative Example |
| 17 | C | 968 | 17.2 | 14 | 16650 | 39 | Comparative Example |
| 18 | C | 806 | 22.9 | 7 | 18457 | 36 | Comparative Example |
| 19 | C | 1066 | 16.6 | 12 | 17696 | 40 | Comparative Example |
| 20 | C | 752 | 39.1 | 55 | 29403 | 46 | Comparative Example |
| 21 | C | 957 | 18.4 | 18 | 17609 | 67 | Comparative Example |
| 22 | D | 955 | 21.3 | 34 | 20342 | 40 | Example |
| 23 | E | 1183 | 17.3 | 33 | 20466 | 45 | Example |
| 24 | F | 816 | 26.0 | 43 | 21216 | 46 | Example |
| 25 | G | 816 | 34.5 | 46 | 28152 | 46 | Example |
| 26 | H | 761 | 28.3 | 34 | 21536 | 90 | Comparative Example |
| 27 | I | 1185 | 14.3 | 5 | 16946 | 42 | Comparative Example |
| 28 | J | 758 | 33.2 | 47 | 25166 | 39 | Comparative Example |
| 29 | K | 1248 | 14.8 | 10 | 18470 | 44 | Comparative Example |
| 30 | L | 986 | 20.5 | 36 | 20213 | 42 | Example |
| 31 | M | 1036 | 28.5 | 48 | 29526 | 49 | Example |
| 32 | N | 1067 | 24.0 | 44 | 25608 | 38 | Example |
| 33 | O | 1013 | 27.6 | 50 | 27959 | 47 | Example |
| 34 | P | 981 | 27.7 | 55 | 27174 | 46 | Example |

TABLE 5-continued

| No. | Steel sample ID | TS (MPa) | El (%) | λ (%) | TS × El (MPa · %) | \|ΔTS\| (MPa) | Remarks |
|---|---|---|---|---|---|---|---|
| 35 | Q | 1014 | 19.4 | 32 | 19672 | 42 | Example |
| 36 | R | 980 | 21.1 | 32 | 20678 | 37 | Example |
| 37 | S | 1018 | 18.8 | 30 | 19138 | 24 | Example |
| 38 | T | 998 | 26.9 | 41 | 26846 | 47 | Example |
| 39 | U | 1093 | 19.3 | 34 | 21095 | 40 | Example |
| 40 | V | 876 | 24.0 | 37 | 21024 | 23 | Example |
| 41 | W | 978 | 20.5 | 26 | 20049 | 27 | Example |
| 42 | X | 982 | 21.8 | 33 | 21408 | 39 | Example |
| 43 | Y | 1125 | 16.9 | 32 | 19013 | 49 | Example |
| 44 | Z | 785 | 26.8 | 26 | 21038 | 45 | Example |

Underlines indicate outside presently disclosed range.

As shown in Table 5, the Examples had a TS of 780 MPa or more, and were excellent in ductility and stretch flangeability, balance between high strength and ductility, and in-plane anisotropy of TS. The Comparative Examples were inferior in any one or more of strength, ductility, stretch flangeability, balance between strength and ductility, and in-plane anisotropy of TS.

Although one of the disclosed embodiments has been described above, the present disclosure is not limited by the description that forms part of the present disclosure in relation to the embodiments. That is, a person skilled in the art may make various modifications to the embodiments, examples, and operation techniques disclosed herein, and all such modifications will still fall within the scope of the present disclosure. For example, in the above-described series of heat treatment processes in the production method disclosed herein, any apparatus or the like may be used to perform the heat treatment processes on the steel sheet as long as the thermal hysteresis conditions are met.

INDUSTRIAL APPLICABILITY

It is therefore possible to produce a high-strength steel sheet having a TS of 780 MPa or more, not only excellent ductility but also excellent stretch flangeability, and excellent in-plane anisotropy of TS. A high-strength steel sheet obtainable according to the presently disclosed production method is very useful in industrial terms, because it can improve fuel efficiency when applied to, for example, automobile structural members by a reduction in the weight of automotive bodies.

The invention claimed is:

1. A method of producing a high-strength steel sheet having a tensile strength TS of 780 MPa or more, the method comprising:
providing a steel slab having a chemical composition consisting of, in mass %,
C: 0.08% or more and 0.35% or less,
Si: 0.50% or more and 2.50% or less,
Mn: 1.50% or more and 3.00% or less,
P: 0.001% or more and 0.100% or less,
S: 0.0001% or more and 0.0200% or less, and
N: 0.0005% or more and 0.0100% or less,
optionally, in mass %, at least one element selected from the group consisting of
Al: 0.01% or more and 1.00% or less,
Ti: 0.005% or more and 0.100% or less,
Nb: 0.005% or more and 0.100% or less,
V: 0.005% or more and 0.100% or less,
B: 0.0001% or more and 0.0050% or less,
Cr: 0.05% or more and 1.00% or less,
Cu: 0.05% or more and 1.00% or less,
Sb: 0.0020% or more and 0.2000% or less,
Sn: 0.0020% or more and 0.2000% or less,
Ta: 0.0010% or more and 0.1000% or less,
Ca: 0.0003% or more and 0.0050% or less,
Mg: 0.0003% or more and 0.0050% or less, and
REM: 0.0003% or more and 0.0050% or less,
with the balance being Fe and inevitable impurities,
heating the steel slab to 1100° C. or more and 1300° C. or less;
hot rolling the steel slab at a finisher delivery temperature of 800° C. or more and 1000° C. or less, to obtain a hot-rolled sheet;
coiling the hot-rolled sheet at a coiling temperature of 300° C. or more and 700° C. or less;
subjecting the hot-rolled sheet to pickling treatment;
thereafter optionally holding the hot-rolled sheet in a temperature range of 450° C. or more and 800° C. or less for a time of 900 s or more and 36000 s or less;
thereafter cold rolling the hot-rolled sheet with a rolling reduction of 30% or more, to obtain a cold-rolled sheet;
thereafter subjecting the obtained cold-rolled sheet to first annealing treatment of $T_1$ temperature or more and 950° C. or less;
thereafter cooling the cold-rolled sheet at an average cooling rate of 5° C./s or more at least to ($T_2$ temperature+100° C.);
thereafter cooling the cold-rolled sheet to room temperature;
thereafter reheating the cold-rolled sheet to a temperature range of 740° C. or more and the $T_1$ temperature or less to perform second annealing treatment;
thereafter cooling the cold-rolled sheet to the $T_2$ temperature or more and (the $T_2$ temperature+150° C.) or less at a first average cooling rate of 8° C./s or more as primary cooling;
thereafter cooling the cold-rolled sheet to a cooling end temperature at a second average cooling rate of 3° C./s or more as secondary cooling, the cooling end temperature being 150° C. or more and (the $T_2$ temperature−10° C.) or less, wherein an average cooling rate after the second annealing treatment is higher in the primary cooling than in the secondary cooling;
thereafter reheating the cold-rolled sheet to a reheating temperature range that is (the $T_2$ temperature−50° C.) or more and (the $T_2$ temperature+50° C.) or less and is (the cooling end temperature+5° C.) or more; and
holding the cold-rolled sheet in the reheating temperature range for a time of 10 s or more, wherein the $T_1$ temperature in ° C.=946−203×[% C]$^{1/2}$+45×[% Si]−30×[% Mn]+150×[% Al]−20×[% Cu]+11×[% Cr]+400×[% Ti], and the $T_2$ temperature in ° C.=740−490×[% C]−100×[% Mn]−70×[% Cr], wherein [% C], [% Si], [% Mn], [% Al], [% Cu], [% Cr] and [% Ti] in equations for $T_1$ temperature and $T_2$ temperature denotes a content of C, Si, Mn, Al, Cu, Cr and Ti respectively present in the steel sheet in mass %, and is 0 for any element not present in the steel sheet.

2. The method of claim 1 further comprising:

performing hot-dip galvanizing treatment by immersing in a galvanizing bath at 440° C. or more and 500° C. or less.

* * * * *